United States Patent
Suzuki

[11] Patent Number: 5,870,143
[45] Date of Patent: Feb. 9, 1999

[54] ELECTRONIC APPARATUS WITH GENERIC MEMORY STORING INFORMATION CHARACTERISTIC OF, AND INFORMATION NOT CHARACTERISTIC OF, FUNCTIONS OF THE APPARATUS

[75] Inventor: Atsushi Suzuki, Tokyo, Japan

[73] Assignee: Sony Corporation, Tokyo, Japan

[21] Appl. No.: 891,285

[22] Filed: Jul. 10, 1997

Related U.S. Application Data

[63] Continuation of Ser. No. 410,283, Mar. 24, 1995, abandoned.

[30] Foreign Application Priority Data

Mar. 30, 1994 [JP] Japan ................................. 6-061456

[51] Int. Cl.⁶ .......................... H04N 5/262; H04N 5/222; H04N 5/50
[52] U.S. Cl. .......................... 348/333; 348/239; 348/569
[58] Field of Search .................................. 348/207, 239, 348/333, 334, 569, 211, 143, 153, 232; H04N 5/225, 5/232, 5/222, 5/50, 7/18, 5/262, 5/235

[56] References Cited

U.S. PATENT DOCUMENTS

| | | | |
|---|---|---|---|
| 4,855,814 | 8/1989 | Shiraishi et al. | 348/224 |
| 4,989,081 | 1/1991 | Miyagawa et al. | 358/93 |
| 5,212,553 | 5/1993 | Marnoka | 358/188 |
| 5,416,528 | 5/1995 | Yoshimi | 348/569 |
| 5,515,101 | 5/1996 | Yoshida | 348/239 |
| 5,532,761 | 7/1996 | Lee | 348/731 |

FOREIGN PATENT DOCUMENTS

| | | | |
|---|---|---|---|
| 0218291 | 4/1987 | European Pat. Off. | H04N 5/232 |
| 0476842 | 3/1992 | European Pat. Off. | H04N 5/445 |
| 4242986 | 6/1994 | Germany | H04N 5/445 |
| 2257000 | 12/1992 | United Kingdom | H04N 7/087 |

*Primary Examiner*—Wendy Garber
*Assistant Examiner*—Ngoc-Yen Vu
*Attorney, Agent, or Firm*—Jay H. Maioli

[57] ABSTRACT

An electronic apparatus equipped with a functional information memory, such as a video apparatus adapted to display a self-introduction of the apparatus or to produce a menu for mode setting. The apparatus comprises a memory where multiple kinds of functional information are previously stored, and a display device for displaying additional information of the electronic apparatus on the basis of the functional information stored in the memory. The display device visually represents the information on a CRT and/or a view finder, and the content of the additional information to be displayed is a self-introduction of a function characteristic of the apparatus. The additional information is a menu, and the functional information is stored in the memory after previous supplement of flags thereto.

2 Claims, 7 Drawing Sheets

```
Main Features
   ·Color View Finder
   ·Steady Shot
   ·Hi8
   ·HiFi Stereo
   ·Program AE
   ·Remote Commander
```

1 : MENU ITEM PRESENT
0 : MENU ITEM ABSENT

FIG. 7 (RELATED ART)

ELECTRONIC APPARATUS WITH GENERIC MEMORY STORING INFORMATION CHARACTERISTIC OF, AND INFORMATION NOT CHARACTERISTIC OF, FUNCTIONS OF THE APPARATUS

This is a continuation of application Ser. No. 08/410,283 filed Mar. 24, 1995 now abandoned.

BACKGROUND OF THE INVENTION

1. Field of the Invention

The present invention relates to an electronic apparatus equipped with a memory for storing functional information of the apparatus, and more particularly to a memory-equipped electronic apparatus such as a video apparatus which is capable of producing additional information based on the functional information of the apparatus written previously in a memory such as an EEPROM, so as to display a self-introduction characteristic of the apparatus or to produce a menu for setting a desired mode and so forth.

2. Description of the Related Art

Figure 7:
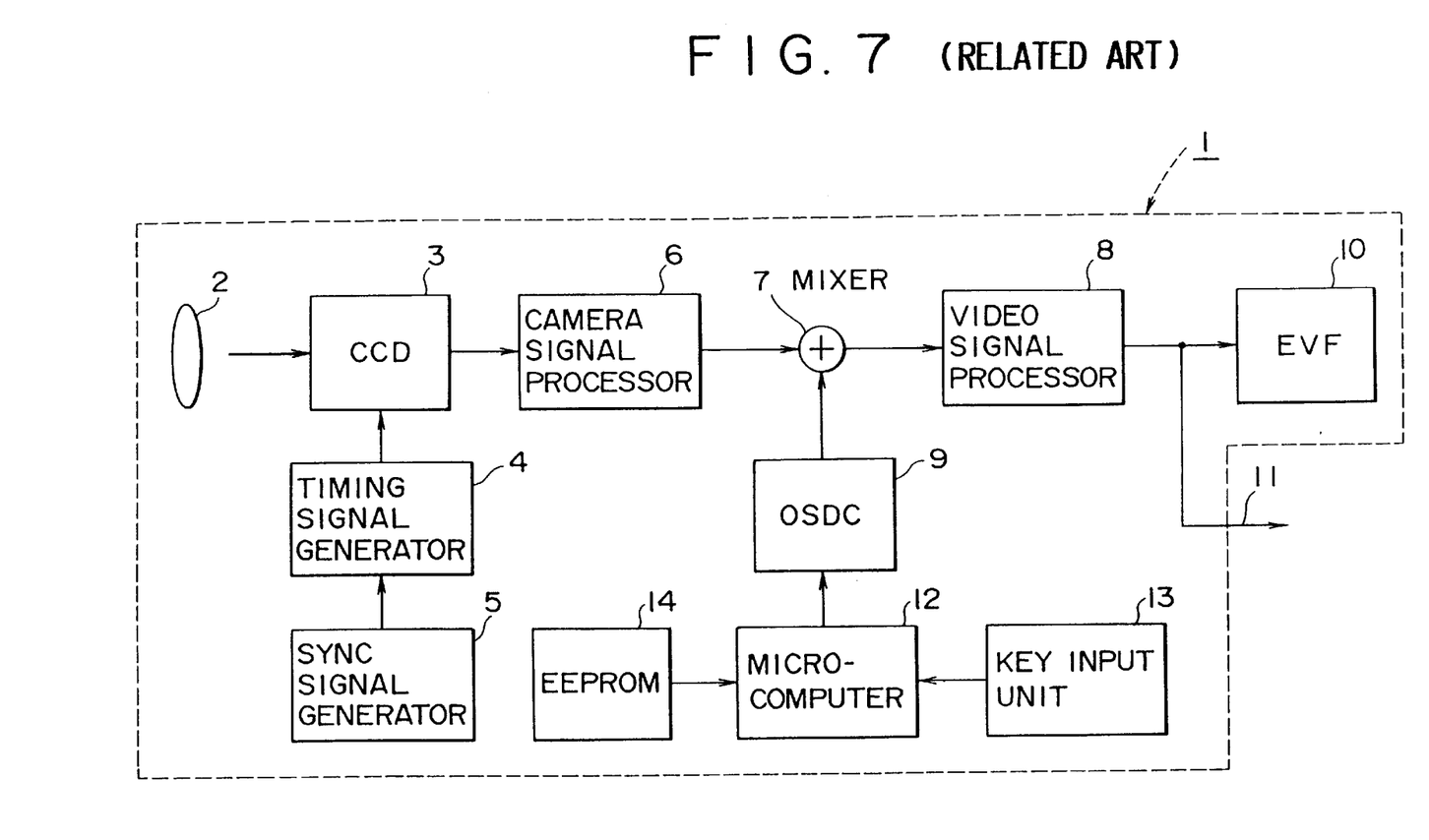
FIG. 7 is a schematic overall block diagram showing the constitution of a video apparatus equipped with additional information.

A conventional electronic apparatus equipped with a functional information memory in the related art, such as a video apparatus 1 shown in a schematic block diagram of FIG. 7, comprises a lens 2, a CCD 3, a timing signal generator 4, a sync signal generator 5, a camera signal processor 6, a mixer 7, an EVF 10, a microcomputer 12, a key input unit 13 and an EEPROM 14. In the video apparatus having the above constitution, the components are connected in the following manner.

An image obtained via an optical lens 2 is decomposed by the CCD 3 and then is input. The timing signal generator 4 for such decomposition is connected to the CCD 3.

The sync signal generator 5 for generating a sync signal, which is used for the decomposition of the image in the CCD 3, is connected to the timing signal generator 4.

The camera signal processor 6 decodes the data output from the CCD 3 into an image signal, and its input side is connected to the CCD 3 while its output side is connected to the mixer 7.

The mixer 7 superimposes character information or the like on the reproduced image signal, and its input side is connected to the camera signal processor 6 and an OSDC 9 while its output side is connected to the video signal processor 8.

The video signal processor 8 serves to convert the image signal into a video signal, and its output side is connected to an EVF (electrical view finder) 10 and a video signal output terminal 11.

The OSDC (on-screen display controller) 9 is a clock for generating characters inclusive of letters, and its input side is connected to the microcomputer 12.

The microcomputer 12 controls actuation of keys and the functional information of the apparatus, and its input side is connected to the key input unit 13 and the EEPROM 14.

The key input unit 13 controls manipulation of operating buttons for the video apparatus and is connected to the microcomputer 12.

The EEPROM 14 serves as a functional information memory where the functional information of the apparatus is previously written in a reprogrammable ROM, and it is connected to the microcomputer 12.

When self-introduction of apparatus features is performed in a retail store or the like, the features of the video apparatus 1 having such constitution are displayed on the EVF 10 or a CRT by the individual self-introduction function prepared per apparatus type.

In the video apparatus 1, it is widely known that a mode is set by the use of a menu displayed on the EVF 10 or the CRT.

However, in different types of electronic apparatus such as video apparatus particularly, the respective functions are generally different from one another, so that it is necessary, for achieving self-introduction of the functions, to produce an individual self-introduction function per apparatus type which consequently raises a problem that common use of the self-introduction display system is not attainable Furthermore, in setting a mode on the basis of the displayed menu, it is usual that the contents and the number of items are distinct due to the differences of the functions depending on the apparatus types, whereby it is rendered necessary to produce different menus of the individual types, hence it fails to permit common use of the system for production of menus and so forth.

In addition, the contents and the number of the items in the menus are not changeable with facility thereby failing to realize common use of the system.

Therefore, the problems need to be so solved that, despite any differences of the functions among the apparatus types, at least a self-introduction function based on the common functional information can be displayed, or a menu based on the functions of the individual apparatus type can be produced.

SUMMARY OF THE INVENTION

It is an object of the present invention to provide an electronic apparatus equipped with a memory for previous storage of multiple kinds of functional information, wherein additional information of the apparatus can be displayed and/or produced on the basis of the functional information stored in the memory.

According to one aspect of the present invention, there is provided an electronic apparatus equipped with a functional information memory, wherein additional information is visually represented on a display device having a CRT and/or a view finder, and the displayed additional information signifies self-introduction of the functions characteristic of the apparatus. The additional information thus produced is a menu, and the functional information of the electronic apparatus is stored in the memory after previous supplement of flags thereto. The electronic apparatus is a video apparatus and the memory is an EEPROM.

The electronic apparatus having the above constitution with a functional information memory is capable of performing the following operations.

(1) Since additional information is displayed and/or produced on the basis of the functional information of the electronic apparatus stored in the memory, the function characteristic of each apparatus can be displayed by the same procedure despite any difference of the apparatus types, and a mode setting menu or the like can be produced in the same manner.

(2) As the additional information is displayed on a view finder or a CRT, the display of the function produced unique to the individual apparatus can be simply executed.

(3) The displayed additional information signifies self-introduction of the function of the electronic apparatus, so that the introduction of the function characteristic of each of different apparatus can be achieved by the same procedure.

(4) Since a menu is produced on the basis of the functional information stored in the memory, the operations of mode setting and so forth, which are distinct depending on the apparatus types, can be executed by the same procedure.

(5) Due to storage of the functional information of the electronic apparatus after previous supplement of flags thereto, extraction of the functional information characteristic of each apparatus type can be simplified even though the types are different.

(6) As the electronic apparatus is a video apparatus systems of displaying and producing the entire additional information for video apparatus of different types can be rendered common.

(7) Since the memory consists of an EEPROM, the stored contents in the memory can be changed with simplicity.

Owing to the constitution mentioned above, the following advantageous effects are achievable in the electronic apparatus of the present invention equipped with a functional information memory.

First, the additional information of the electronic apparatus is displayed and/or produced on the basis of the functional information stored in the memory, so that a remarkably superior effect is attained in realizing common display and production of the additional information for a plurality of apparatus types, and the displayed contents can be freely changed with simplicity by adequately altering the fundamental functional information in the memory.

As the additional information is displayed on a view finder or a CRT, the constitution can be simplified without the necessity of any particular device for displaying the information.

Since the displayed additional information signifies self-introduction of the function of the electronic apparatus, there is obtainable an extremely useful effect that the self-introduction display systems for a plurality of apparatus types can be rendered common, and the display of the function introduction can be freely changed with ease merely by changing the contents of the functional information memory.

Owing to the contrivance where a menu is formed on the basis of the functional information held in the memory, the system of producing menus for a plurality of apparatus types can be rendered common. And a remarkably superior advantage is achievable in the point that the menu contents are alterable with facility by changing the functional information held in the memory.

Due to storage of the functional information of the electronic apparatus after previous supplement of flags thereto, selection of the required information is very simple despite the differences of the apparatus types which allows realization of common use of the system.

Furthermore, as the electronic apparatus is a video apparatus control of the additional information in general video apparatus of different types can be systematized to thereby simplify the constitution.

Besides the above, since the memory consists of an EEPROM, there is attained another remarkable advantage that the stored values therein can be simply altered to thereby change the contents of the menu with facility.

The above and other features and advantages of the present invention will become apparent from the following description which will be given with reference to the illustrative accompanying drawings.

DETAILED DESCRIPTION OF PREFERRED EMBODIMENTS

Hereinafter preferred embodiments of the present invention representing an electronic apparatus, particularly a video apparatus equipped with a functional information memory, will be described in detail with reference to the accompanying drawings. The whole constitution of such an electronic apparatus, particularly a video apparatus with a functional information memory, is the same as that of the aforementioned conventional one of the related art shown in FIG. 7. Accordingly, like components corresponding to those of the conventional apparatus are denoted by like reference numerals or symbols, and a repeated explanation thereof is omitted here.

Figure 1:
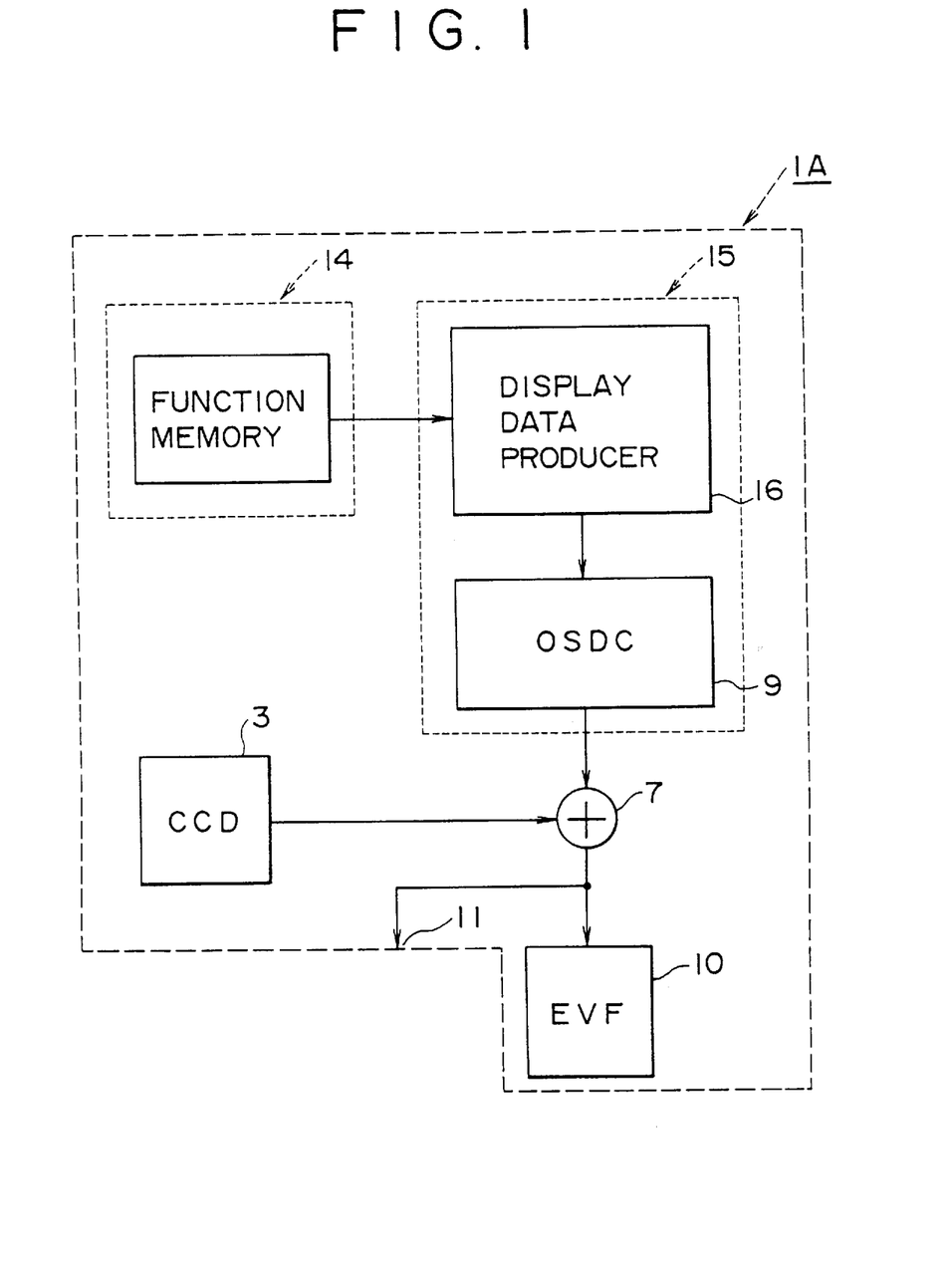
FIG. 1 is an explanatory diagram showing principal components of a display/produce unit in an electronic apparatus with a functional information memory according to a first embodiment of the present invention.

An electronic apparatus with a functional information memory according to a first embodiment of the present invention, particularly a video apparatus 1A, comprises an EEPROM 14, a self-function display/produce unit 15, a CCD 3, a mixer 7 and an EVF (electrical view finder) 10.

The EEPROM 14 is a functional information memory for recording and holding the functional information of the video apparatus 1A, and the functional information is output therefrom adaptively to the self-function display/produce unit 15.

The self-function display/produce unit 15 extracts the information, which is required for self-function introduction, from the functional information recorded in the EEPROM 14, and then produces self display data characteristic of the apparatus. This unit 15 consists of a display data producer 16 and an OSDC (on-screen display controller) 9.

The display data producer 16 produces data for introduction of self function, and the OSDC 9 controls the display of the self-function introduction.

Figure 2:
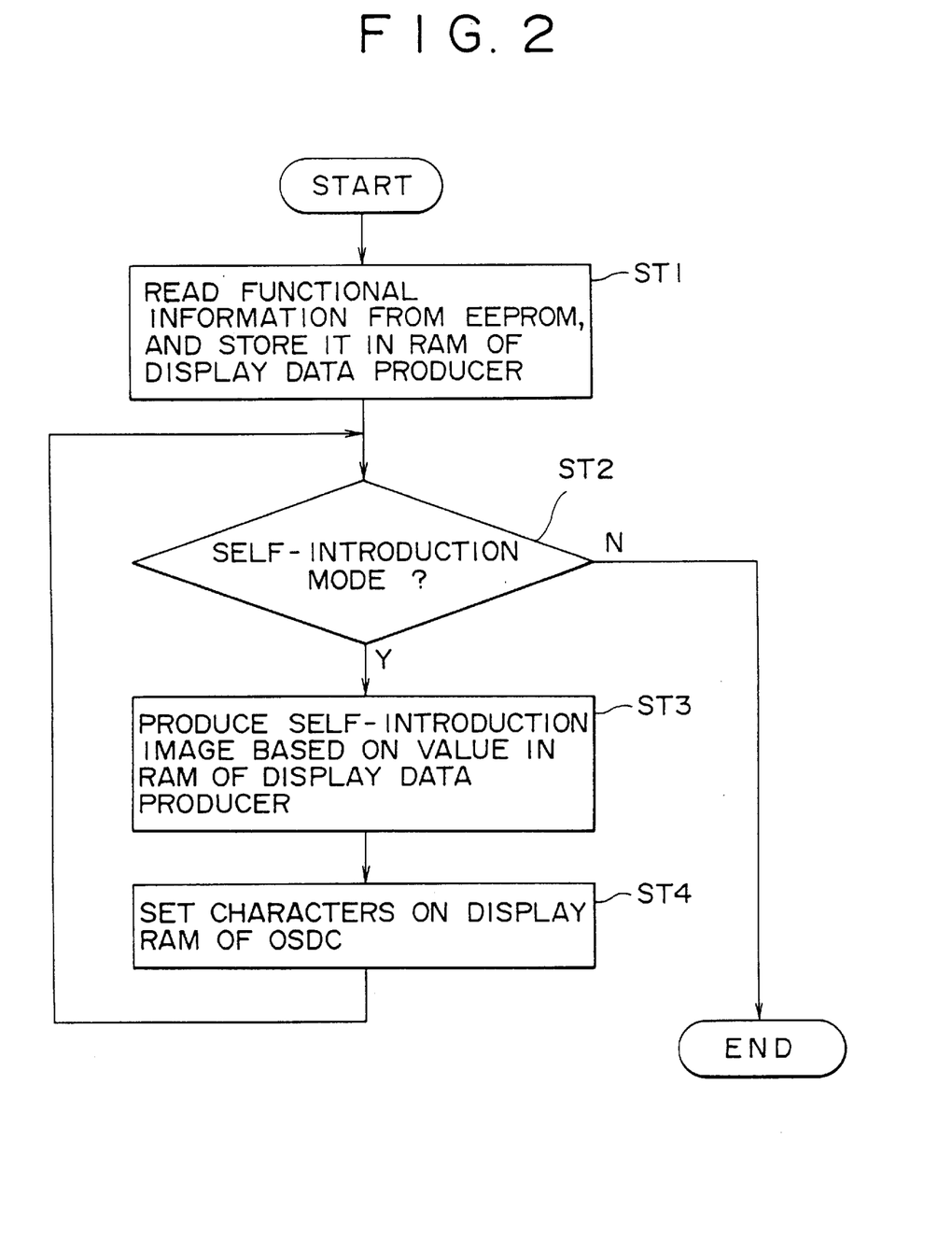
FIG. 2 is a flow chart of a routine executed for displaying and/or producing a self-introduction in the display/produce unit of FIG. 1.

In the electronic apparatus, particularly the video apparatus 1A equipped with a functional information memory of the above constitution, an image for introduction of the self function can be produced and displayed according to the routine shown in FIG. 2.

First, the functional information in the EEPROM 14 is read out therefrom and then is stored in a RAM incorporated in the display data producer 16 (ST1).

If the functional information does not signify a self introduction mode, no further process is executed and the procedure is terminated (ST2).

When the functional information signifies a self introduction mode, a self introduction image is produced on the basis of the value in the RAM of the-display data producer 16 (ST3).

Thereafter, characters to be displayed are set in a display RAM incorporated in the OSDC 9, whereby a series of the processing steps are completed (ST4).

Figure 3:
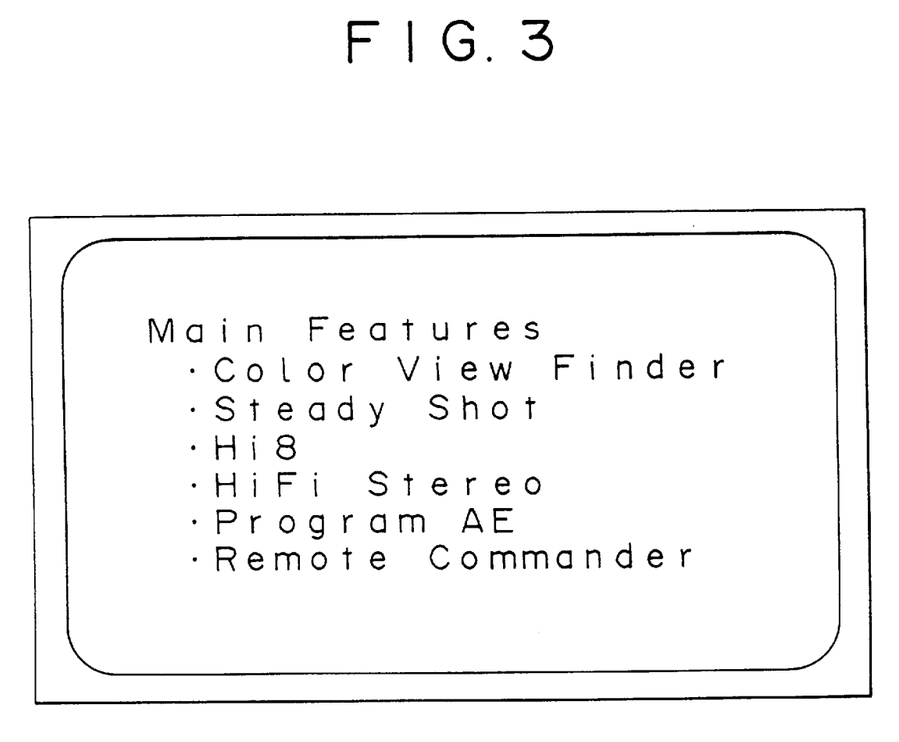
FIG. 3 is an explanatory diagram showing an example of displayed contents.

The self-introduction image thus produced can be displayed as shown in FIG. 3, where individual functions characteristic of the apparatus type are listed.

Figure 4:
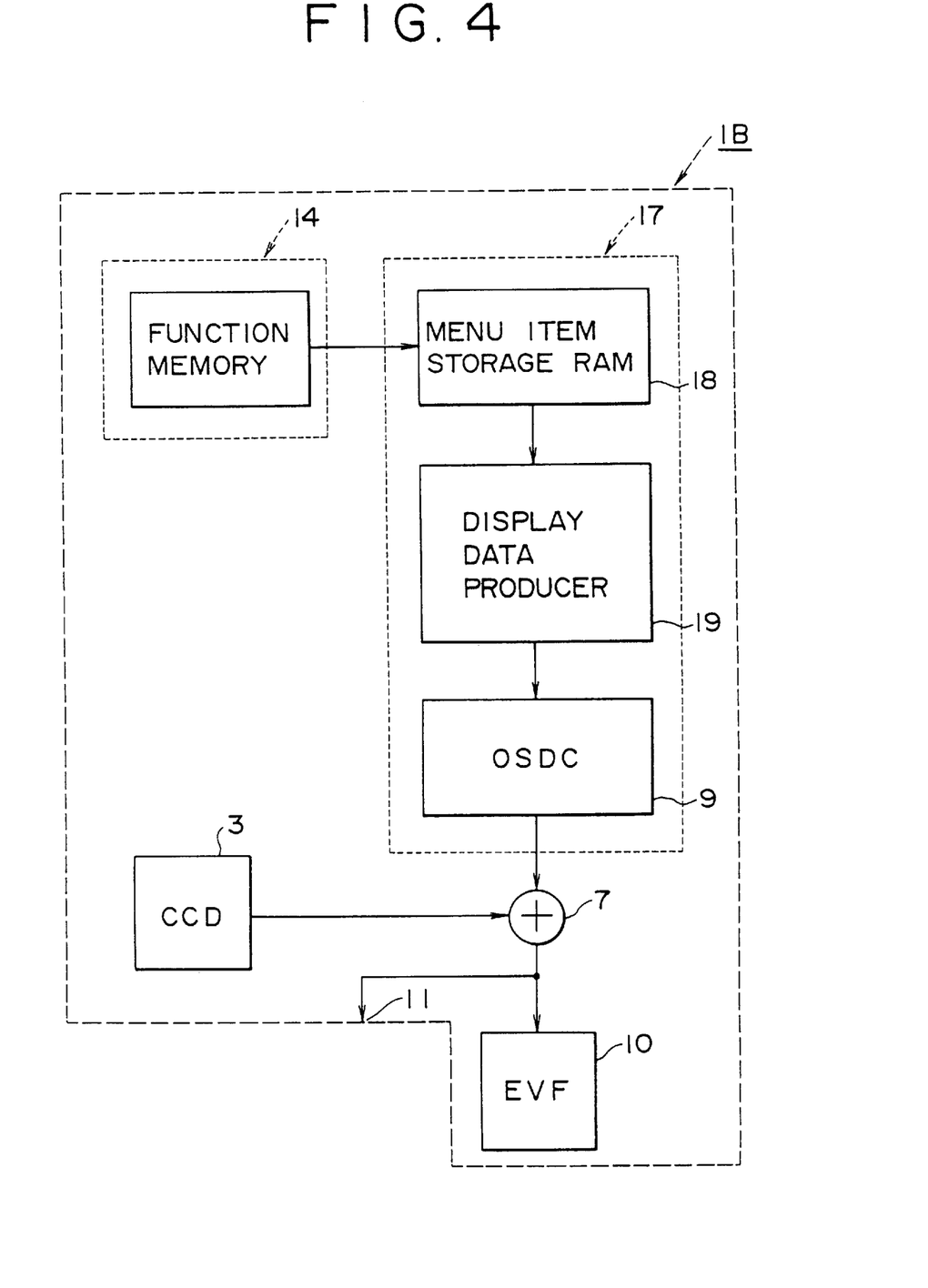
FIG. 4 is an explanatory diagram showing principal components of a menu produce unit in an electronic apparatus with a functional information memory according to a second embodiment of the present invention.

An electronic apparatus with a functional information memory according to a second embodiment of the present invention, particularly a video apparatus 1B, produces a menu image on the basis of the functional information of the apparatus written in an EEPROM 14. As shown in FIG. 4, this apparatus comprises an EEPROM 14, a menu produce unit 17, a CCD 3, a mixer 7 and an EVF 10. These components are connected in the following manner.

The EEPROM 14 is a functional information memory where the functional information signifying the apparatus functions is stored with a flag annexed thereto, and such functional information is supplied to the menu produce unit 17 when necessary.

The menu produce unit 17 consists of menu item storage RAM 18, a display data producer 19 and an OSDC 9.

The menu item storage RAM 18 is a memory for storing the functional information required for the individual apparatus, and such functional information characteristic of the apparatus is obtained from the EEPROM 14 then is supplied to the display data producer 19.

The display data producer 19 serves to produce a menu image on the basis of the functional information peculiar of the apparatus, and its output side is connected to the OSDC 9.

The OSDC 9 produces characters inclusive of letters.

Figure 5:
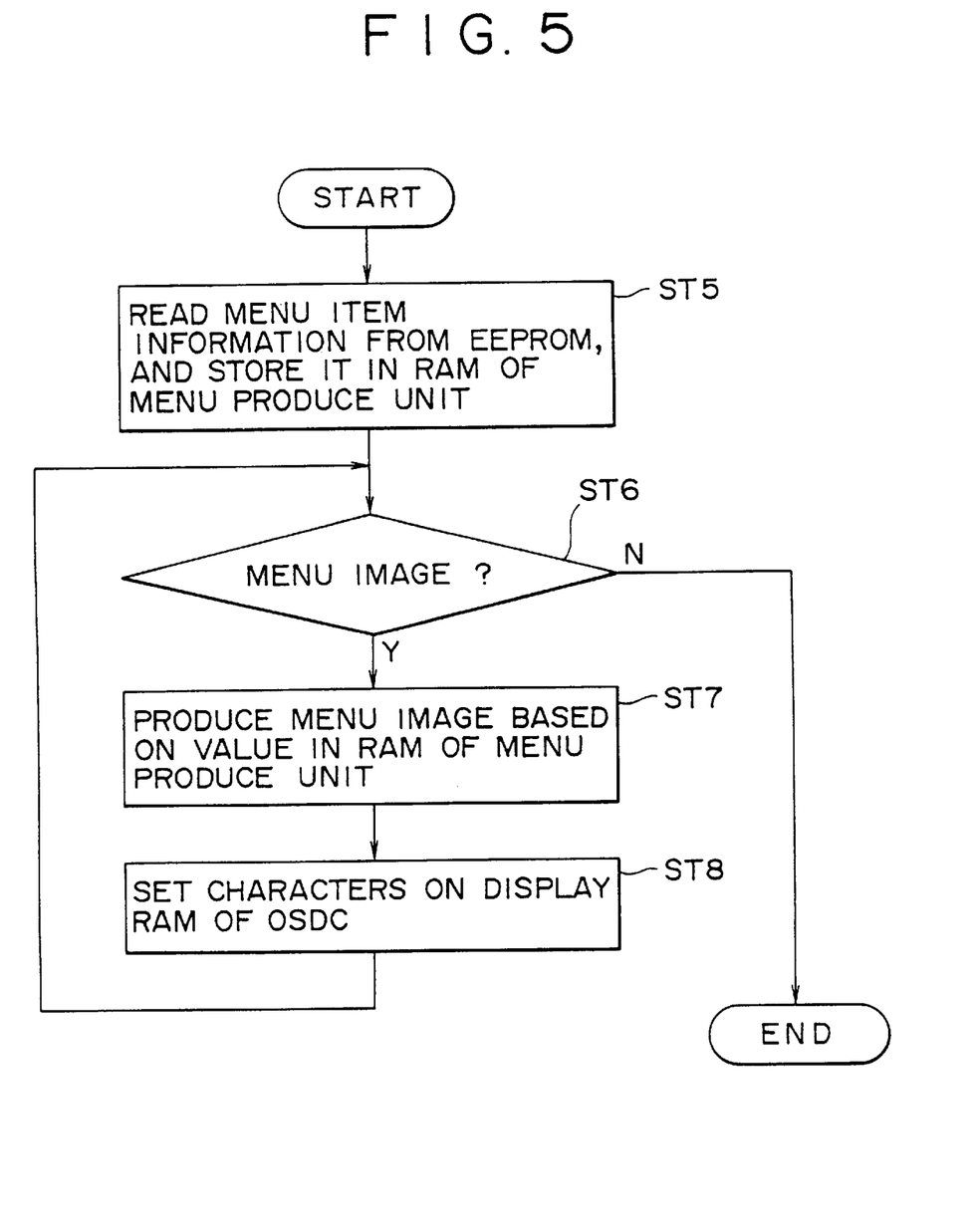
FIG. 5 is a flow chart of a routine executed for producing a menu in the menu produce unit of FIG. 4.

The electronic apparatus with the functional information memory of the above constitution, particularly the video apparatus 1B, produces a mode setting menu image according to the procedure of FIG. 5 for example.

Figure 6:
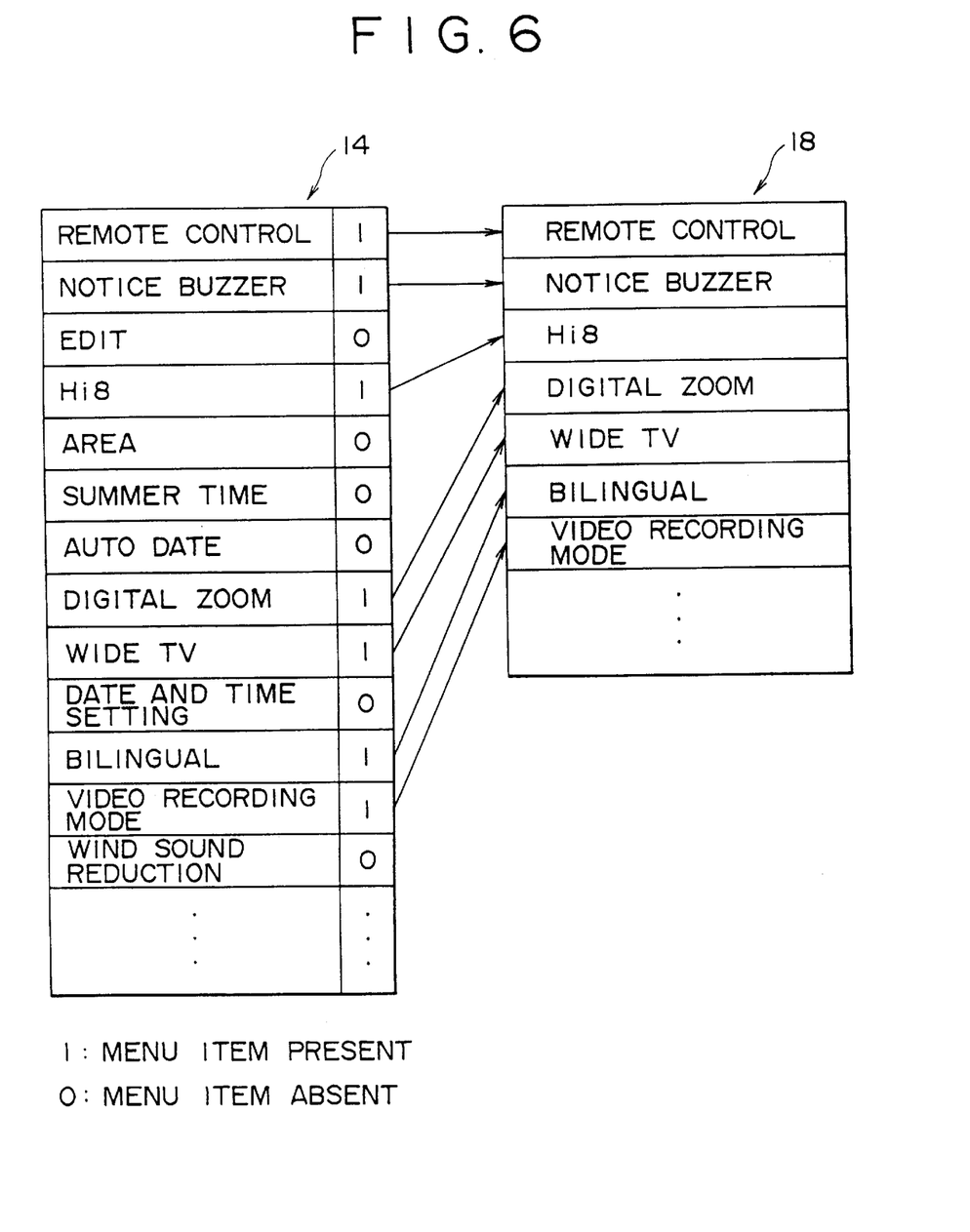
FIG. 6 is an explanatory diagram showing functional information of the apparatus stored with flags in a functional information memory of the electronic apparatus.

First, the menu item information stored in the EEPROM 14 is read out therefrom and then is held in the RAM 18 incorporated in the menu produce unit 17 (ST5). When multiple kinds of functional information are stored in the EEPROM 14, flags are previously annexed to the functional information of the apparatus as shown in FIG. 6. For example, a flag "1" is annexed to the function characteristic of the apparatus, while a flag "0" is annexed to any other information.

Therefore, for extraction by the RAM 18 in the menu produce unit, production of a menu image characteristic of the apparatus can be realized by extracting the function with flags "1" annexed thereto, such as "Remote Control", "Notice Buzzer", "Hi8", and so forth. Of course, the setting of each flag is adaptively changeable.

In the case of no selection of the menu image, the process is terminated in the state where the menu information is held in the RAM 18 in the menu produce unit (ST6).

When the menu image has been selected, a menu is produced on the basis of the information obtained from the RAM 18 in the menu produce unit (ST7).

Subsequently, the menu thus produced is set as display characters on the display RAM of the OSDC 9, so that the functional information characteristic of the video apparatus can be displayed adaptively (ST8).

As described, in the first and second embodiments, self introduction data can be displayed by extracting the selected function characteristic of the apparatus from the functional information held in the EEPROM 14 of the electronic apparatus, or a menu can be produced out of the functional information characteristic of the apparatus and can be used for mode setting with remarkable facility.

Consequently, even though the apparatus types are different, there can be established a common system for producing a menu and so forth required for self-introduction function and mode setting in any apparatus used for the same purpose, such as video apparatus, AV apparatus inclusive of television, and OA apparatus.

What is claimed is:

1. A video camera equipped with a functional information memory, comprising:

lens means for condensing light from a subject being shot;

a charge-coupled device for converting into an electric signal the light obtained from said lens means;

a video signal processing circuit for converting the electric signal from said charge-coupled device into a video signal;

an EEPROM for storing a plurality of predetermined functional information including information relating to functions of said video camera and information relating to functions of other video cameras in addition to said video camera, said information relating to functions of said video camera and said information relating to functions of said other video cameras being distinguished by pre-programmed flags;

means including a menu item storage RAM and a display data producer for extracting said information relating to functions of said video camera distinguished by said pre-programmed flags from said EEPROM for producing a fixed menu image and for storing said menu image in said RAM, wherein said menu image includes one of a self-introduction of said video camera and a menu for mode setting, and wherein said means for extracting is connected to said EEPROM;

an on-screen display controller for controlling display of said menu image;

a mixer for combining outputs of said on-screen display controller and said video signal processing circuit; and a view finder for displaying thereon an output of said mixer.

2. A method for displaying menu information relating to a particular one of a plurality of different video cameras for use in a video camera including a functional information EEPROM memory, a menu item storage RAM memory, a display data producer, an on-screen display controller, a charge-coupled device, a mixer, and an electronic viewfinder, said method for displaying menu information comprising the steps of:

storing functional information relating to all possible functional modes of said plurality of different video cameras including said particular one in said functional information EEPROM memory;

pre-programming flags by annexing flags to a particular plurality of functional modes relating to said particular one of said plurality of different video cameras in said functional information EEPROM memory;

reading said particular plurality of functional modes having flags annexed in said pre-programming flags step from said functional information EEPROM memory and storing it in said menu item storage RAM memory;

producing a fixed menu image using said display data producer based on said information stored in said menu item storage RAM memory, wherein said menu image includes one of a self-introduction of said video camera and a menu for mode setting; and displaying said menu image on said electronic view finder using said on-screen display controller.

* * * * *